United States Patent [19]
Furlani

[11] Patent Number: 5,813,000
[45] Date of Patent: Sep. 22, 1998

[54] B TREE STRUCTURE AND METHOD

[75] Inventor: John L. Furlani, Raleigh, N.C.

[73] Assignee: Sun Micro Systems, Mountain View, Calif.

[21] Appl. No.: 615,732

[22] Filed: Mar. 14, 1996

Related U.S. Application Data

[63] Continuation of Ser. No. 196,592, Feb. 15, 1994, abandoned.

[51] Int. Cl.$^6$ ................................................ G06F 17/30
[52] U.S. Cl. ................................................ 707/3
[58] Field of Search ................................ 707/100, 102, 707/103, 1, 2

[56] References Cited

U.S. PATENT DOCUMENTS

| | | | |
|---|---|---|---|
| 4,827,419 | 5/1989 | Selby, III | 701/200 |
| 4,974,197 | 11/1990 | Blount et al. | 707/204 |
| 4,987,533 | 1/1991 | Clark et al. | 707/204 |
| 5,040,110 | 8/1991 | Miki et al. | 707/200 |
| 5,222,235 | 6/1993 | Hintz et al. | 707/101 |
| 5,276,867 | 1/1994 | Kenley et al. | 707/204 |
| 5,287,473 | 2/1994 | Mohan et al. | 711/133 |
| 5,408,630 | 4/1995 | Moss | 711/112 |
| 5,446,857 | 8/1995 | Russ | 711/100 |
| 5,454,101 | 9/1995 | Mackay et al. | 707/3 |

OTHER PUBLICATIONS

"The UiniTree Virtual Disk System An Overview", General Atomics/DISCOS Division, pp. 1–25, Dec. 1991.
A Dynamic Storage Allocation Algorithm Suitable for File Structures, *Information Systems*, vol. 15, No. 5, pp. 515–521, 1990 Barza–Yates.
Space/Time Trade–off in Hash Coding with Allowable Errors, Burton H. Bloom Cummunications of the ACM, vol. 13, No. 7, Jul. 1970.

(List continued on next page.)

*Primary Examiner*—Thomas G. Black
*Assistant Examiner*—Jack M. Choules
*Attorney, Agent, or Firm*—Steven F. Caserza; Flehr Hohbach Test Albritton & Herbert LLP

[57] ABSTRACT

A novel B tree data structure is taught and implemented for use in conjunction with a tertiary storage system. The tertiary storage system utilizes three levels of memory hierarchy: primary memory, such as RAM; read-write secondary storage, such as disk memory; and lower speed, and less expensive mass storage, for example a CD-ROM. A novel B tree is utilized to access data stored in two or more types of memory, such as a CD-ROM memory and a disk drive memory, and adapts for the provision of updated data stored on the hard disk which either replaces or supplements data stored on the CD-ROM. The B tree includes, for each data bucket, a pointer for both a CD-ROM and a disk drive location, and are, in certain embodiments, used in conjunction with a bit mask to indicate the presence of valid data in a first one of the memories, such as CD-ROM, and, if desired, a bloom filter associated with data stored in the second memory type, such as a magnetic disk, in order to speed accesses. The B tree of this invention is capable of being split, as needed, when entries are inserted into memory.

18 Claims, 6 Drawing Sheets

Splitting in a B3-Tree

OTHER PUBLICATIONS

File Organizations and Access Methods for CLV Optical Discs, Christodoulakis et al. Dept of Computer Science, University of Waterloo, Waterloo, Ontario, N2L 3G1, Jun. 1998.

An Analysis of B–Trees and Their Variants, Chu et al., Information Systems, vol. 14, No. 5, pp. 359–370, 1989.

The Ubiquitious B–Tree, Computing Surveys, vol. 11, No. 2, Jun. 1979, Douglas Comer.

Bit–Tree: A Data Structure for Fast File Processing, David E. Ferguson, Communications of the ACM/Jun. 1992/vol. 35, No. 6, pp. 116–120.

Adaptive Hasing, Hsiao et al., Information Systems, vol. 13, No. 1, pp. 111–127, 1988.

The Art of Computer Programming, vol. 3, Searching and Sorting, pp. 473–479, 1973.

A New Method for Fast Data Searches with Keys, IEEE Software, pp. 16–24. Letwter, et al., 1987.

A Quasi–distributed Architectire for Database Management Systems, A. Tharp, Computer Science Department, North Carolina State University, Raleigh, N.C. 1989.

B+ Trees, Bounded Disorder and Adaptive Hashing, Tharp et al., Information Systems, vol. 16, No. 1, pp. 65–71, 1991.

CD–ROM Reaches for Critical Mass, Lee The', Datamation, 1992, pp. 47–50.

Quasi-Distributed Architecture

The B3-tree Terminal Node

STEP 1: Load the B3-tree with records only on CD-ROM.

STEP 2: Add records (in order) 45,58,62,52, and 67. The hard drive buckets are allocated to contain the added records.

STEP 3: Adding the record 68 causes the tree to split.

STEP 4: Adding the record 48 causes the tree to split again.

Splitting in a B3-Tree

B TREE STRUCTURE AND METHOD

This is a continuation of application Ser. No. 08/196,592 filed Feb. 15, 1994 now abandoned.

TECHNICAL FIELD

This invention pertains to data storage algorithms, and more particularly to a novel B tree structure and method particularly well suited to a three-level memory structure, such as those which employ CD-ROMS, disk drives, and semiconductor memory.

BACKGROUND

The read-only compact disk (CD-ROM) is rapidly finding its way into the computing environment. The CD-ROM presents computer scientists and users with a significant new form of data storage. This new form of data storage introduces a storage model that differs from the traditional model in that there are three levels instead of two levels of storage.

Algorithm and data structure development has been primarily based on a two tiered storage structure. The first tier is the computer's primary memory, typically RAM, which is extremely fast in relation to the second tier. The second tier is the computer's disk drive, which is often more than 200,000 times slower than primary memory. If primary memory were fast, nonvolatile, and cheaper, secondary storage might not be necessary. To achieve reasonable computing performance, traditional algorithms have centered on minimizing the number of secondary storage accesses.

The design of data storage algorithms has centered around optimizing data insertion and retrieval within a two tiered storage model. The CD-ROM adds a third, even slower, level of storage beyond the hard drive. Not only is the CD-ROM over 25 times slower than a hard disk drive and over 5 million times slower than primary memory; it is also read-only. Although the CD-ROM is slower and its data is unchangeable, the CD-ROM does have extraordinary cost advantages. Today, commercial mastering of a new CD-ROM costs about $1,200. When CD-ROMs are purchased in fairly large quantities, the cost per CD-ROM is between $1.50 and $2.00. With current formatting techniques, each CD-ROM can store approximately 550 Mbytes of usable data, as described in The, Lee, "CD-ROM Reaches for Critical Mass," Datamation, Vol. 38, No. 9, pp. 47–50 (Apr. 15, 1992). Thus, the cost per Mbyte of storage is less than one cent for an order of 1,000 CD-ROMs. Compare this cost with $7 or more per Mbyte for hard disks and over $50 per Mbyte for primary memory.

CD-ROMs are becoming more prevalent in the computer marketplace. Currently, they are used for distributing software, storing digital audio and video movies for playback, storing static lists of names or products, storing databases such as encyclopedias, and many other applications not requiring the modification of the data set.

Applications with large, fairly static databases benefit most from the tertiary storage model. Fortunately, many applications fit this description. For example, greeting card stores carry much of the same merchandise. The cards are the same from store to store, and the retail price for the card is fixed. But greeting card stores often carry local or special merchandise. A greeting card distribution company could release a CD-ROM containing prices, order numbers, and descriptions for all of the cards and other "standard" merchandise very inexpensively. Using the tertiary storage model, the local retail outlets could use this data as the primary database and then make changes for specialty items.

Another typical application is a large customer database. Once mastered on a CD-ROM, the database can be distributed to many retail outlets. The local outlets can localize the database by adding new customers. After six months or so, the local additions can be collected, and a new CD-ROM can be mastered for redistribution. Retail outlets will be able to access and recognize many customers across the region. The cost for such a system would be minimal compared with an on-line network connecting all of the retail outlets.

Tharp, A. L. and Middleton, E.A. "A Quasi-Distributed Architecture for Database Management Systems," Proceedings of the ACM Computer Science Conference, pp. 344–347 (1989) proposed a three level storage hierarchy as a means for achieving a quasi-distributed database architecture. Data is stored at one of the three levels based upon update frequency. C data, which is constantly (or continually) updated, is stored at a central site in primary memory. R data, which is rarely updated, is stored at remote sites on CD-ROMs. And V data, which is updated at a variable rate, is stored at both sites on hard disks. FIG. 1 displays the quasi-distributed architecture. The quasi-distributed architecture has the advantages of a faster response when retrieving data locally and simple recovery at local sites.

The B+ tree is a widely used data structure for storing and retrieving records for both direct and sequential access, as described in Comer, D., "The Ubiquitous B-tree," ACM Computer Surveys, Vol. 11, No. 2, pp. 121–137 (1979). Because of the B+ tree's shallow depth, retrieving data requires only a few probes of secondary storage.

A B+ tree (identified as such by Knuth, D. E., "The Art of Computer Programming, Vol. 3: Sorting and Searching," Addison-Wesley, Reading, Mass, 1973, pp. 473–480) stores all of its data in a sequence of linked data buckets. Nonterminal nodes of the B tree index reference terminal nodes, which in turn reference the data buckets. Direct or random access of the data is accomplished by traversing the B tree, and sequential access is accomplished by following the linked data buckets, left to right. The B+ tree's restructuring of the data into indexed buckets allows for more of the B tree index to be stored in primary memory. Often the data bucket size is selected to match the blocking factor of the disk such that a single access of the media retrieves the whole data bucket. Offsetting the B+ tree's retrieval benefits is its poor storage utilization. Storage utilization is usually in the 50–65% range because the splitting rules create nodes and data buckets with 50% storage utilization. Implementing the index as a B* tree or a B# tree can improve the overall storage utilization, as described in Tharp, A. L., "File Organization and Processing," John Wiley & Sons, New York, N.Y. (1988).

Prior art B trees have focused on a two-tiered memory structure (i.e. RAM and disk) which has been shown not to work well with CD-ROMs. In addition, no provisions are made in the prior art for the concept of a read-only portion of the B tree. With CD-ROMs and other read-only data, distribution media is becoming more widely used in the marketplace, new data structures and algorithms are needed to successfully use this new media.

SUMMARY

In accordance with the teachings of this invention, a novel B tree data structure is taught and implemented for use in conjunction with a tertiary storage system. The tertiary storage system utilizes three levels of memory hierarchy: primary memory, such as RAM; read-write secondary storage, such as disk memory; and lower speed, and less expensive mass storage, for example a CD-ROM. In accordance with this invention, a novel B tree is utilized to access data stored in two or more types of memory, such as a CD-ROM memory and a disk drive memory, and adapts for the provision of updated data stored on the hard disk with either replaces or supplements data stored on the CD-ROM. In accordance with the teachings of this invention, the B tree includes, for each data bucket, a pointer for both a CD-ROM and a disk drive location, and are, in certain embodiments, used in conjunction with a bit mask to indicate the presence of valid data in a first one of the memories, such as CD-ROM, and, if desired, a bloom filter associated with data stored in the second memory type, such as a magnetic disk, in order to speed accesses. The B tree of this invention is capable of being split, as needed, when entries are inserted into memory.

Unlike the prior art which only permits data to be read from a CD-ROM and does not provide for the uniform integration of the hard disk drive, the B3 tree of this invention allows new or modified data to be stored on disk, and accessed in an integrated fashion with the read only data stored on CD-ROM. The B3 tree of this invention uses a tertiary storage model which permits the tree to maintain all of the attributes of a traditional B tree yet successfully utilize the CD-ROM and other inexpensive read-only media.

DETAILED DESCRIPTION

In accordance with the teachings of this invention, a novel B tree method and structure is taught, which is hereinafter referred to as the "B3 tree". In accordance with this invention, this B3 tree accommodates a multi-level storage hierarchy of storage elements having differing storage characteristics. For example, in one embodiment of this invention, the novel B3 tree operates with a three level memory system, such as in computer systems using fast, yet unfortunately rather expensive primary memory, such as RAM, less expensive and somewhat slower read-write secondary storage, such as one or more magnetic disk storage devices, and less expensive yet slower mass storage, such as available from one or more CD-ROMs. It is to be understood, however, that other types of memory can be used in each of the plurality of levels of storage in a system for which this invention is highly applicable, and it is to be further noted that other types of optical memories, such as read-write optical disks, or one-time programmable optical disks, are within the spirit of this invention. Furthermore, the B3 tree of this invention can be applied to a memory system in which primary memory such as RAM is not utilized as part of the B3 structure, as well as a system archetecture in which a plurality of elements are used for one or more levels of storage, which plurality of elements are distributed across a network.

The following is an outline of the differences between the novel B3 tree various embodiments of this invention and the prior art B+ tree.

Add a second pointer to each terminal node that distinguishes between compact disk data buckets and hard disk data buckets.

Add a pointer to each terminal node that points to the terminal node next in sequential access order.

Maintain a bit mask for each compact disk data bucket.

Maintain a Bloom filter for each hard disk drive data bucket.

Records are inserted the same as with a B+ tree when mastering the CD-ROM. Records are inserted differently once the B3 tree is used with a hard disk drive.

The nodes are split differently because the compact disk data buckets are static.

Records are retrieved in the same manner as with a B+ tree until reaching the terminal node. At the terminal node, the retrieval algorithm is slightly altered to account for the multiple sets of data buckets.

Records are deleted from the CD-ROM by using the bit mask associated with each CD-ROM data bucket.

Each of the novel features listed above are now described in more detail.

The Terminal Nodes Change

Figure 1:
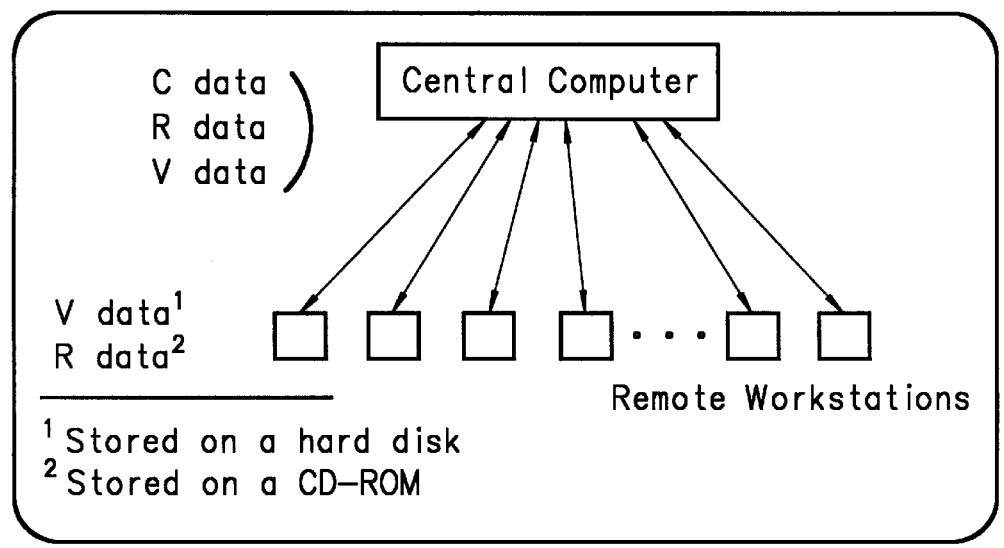
FIG. 1 is a block diagram of a Quasi-distributed architecture.
Figure 2:
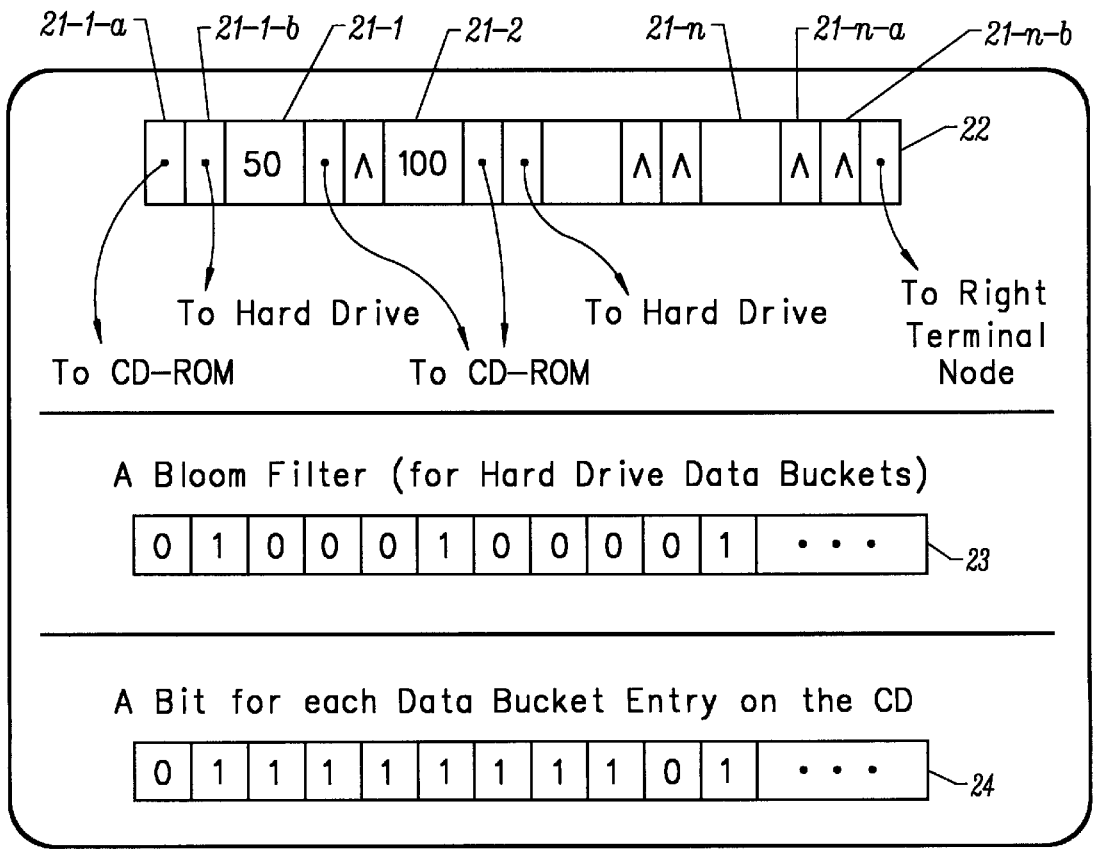
FIG. 2 is a diagram depicting the B3-terminal node in accordance with the teachings of this invention.

With reference to a novel B3 tree terminal node as shown in FIG. 2, instead of maintaining a single pointer in the terminal node for a given data bucket stored in memory and corresponding to a given key 21-N, the data storage algorithm of this invention maintains two pointers in the terminal node. The first pointer 21-N-a is for the read-only data buckets allocated on the CD-ROM associated with key 21-N. The second pointer 21-N-b is for the read-write data buckets allocated on the hard disk drive associated with key 21-N.

The addition of space for an extra pointer in the terminal node is often inconsequential relative to the size of the keys contained in the terminal node. For a B3 tree with a capacity on the order of n elements, the number of pointers and the number of keys contained in a terminal node are given by inequalities (1) and (2).

$$2n+2 \leq \text{pointers} \leq 4n+2 \qquad (1)$$

$$n \leq \text{keys} \leq 2n \qquad (2)$$

In accordance with the teachings of this invention, a bit mask 24 having size equal to the number of records stored in a CD-ROM data bucket is maintained for each CD-ROM data bucket. Each bit in the mask corresponds to a record in the data bucket. The bit mask is used to determine if a record has been deleted from the CD-ROM. Since the bit mask is associated with each CD-ROM data bucket, the size of the mask relative to the size of the data bucket is often insignificant. Records are typically many bytes, for example on the order of hundreds or thousands of bytes storing the information to be retreived. A single bit of additional storage to provide the extra pointer for the terminal nodes of the B3 tree in accordance with this invention is insignificant relative to the size of the records being stored.

Bloom filter 23 is used to reduce the number of hard disk probes, such a filter being described in Bloom, Burton, H., "Space/Time Trade-offs in Hash Coding with Allowable Errors," Communications of the ACM, Vol. 13, No. 7, pp. 422–426 (1970). The Bloom filter is used to weed out records which are known not to be on the CD-ROM. By using the Bloom filter, if a particular key hashes to a bit pattern not contained in the Bloom filter, the CD-ROM is not searched, and thus a slow access is avoided. Since the majority of the data is stored on the CD-ROM, we expect the search for a record on the hard disk to fail most of the time. Because of this property, the Bloom filter significantly reduces the number of hard disk probes necessary to retrieve a record.

Using a Bloom filter for the CD-ROM data buckets reduces the number of probes as well. If retrievals are expected to be empty most of the time, using a Bloom filter for each CD-ROM data bucket is worthwhile after an application deletes many records from the B3 tree. Alternatively, since the time required to do a Bloom filter lookup is quite small, the Bloom filter can always be used.

An additional change to the data maintained in the terminal node is the addition of pointer 22 that links one terminal node to the terminal node next in sequential order. Because the CD-ROM data buckets are read-only, they can not be chained together like traditional B+ tree data buckets and thus pointer 22 is necessary for sequential access of the data. This is because the CD-ROM data buckets cannot be modified, and thus any information about which bucket is on the right cannot be updated as new records are inserted into the tree. What happens is the creation of hard drive data buckets that end up occuring in between the CD-ROM data buckets. So, the knowledge about how to put them back together lives in the terminal node. So, those can be linked together and still maintain the ability to access the data sequentially. If sequential access is not necessary, pointer 22 may be eliminated from the terminal nodes.

Inserting Records

When inserting data into the B3 tree before the CD-ROM is mastered, the insertion algorithm need not be different from that of a normal B+ tree. In fact, because all of the data is known at the time the CD-ROM is mastered, the B3 tree can be optimally packed. Upon completion of the mastering process, the B3 tree index is put onto the CD-ROM with the data. When the CD-ROM is used, this index is copied from the CD-ROM onto the hard disk, where it can be modified to reflect the state of the tree after records are added and deleted from the tree.

In accordance with this invention, the B3 tree insertion algorithm changes when the CD-ROM is being used in conjunction with a hard disk drive. First, the B tree index is traversed to determine the hard drive data bucket 21-N for the new record. The bits representing the key of the record are added to Bloom filter 23 at a location corresponding to the hard drive data bucket. Finally, the record is inserted into a data bucket and a sorted ordering is maintained. Any one of a number of well known sorting alogritms can be used for this purpose, such as a prior art "insertion sort", such as is described in Knuth's "Searching and Sorting" reference (cited earlier) at pp. 80–105. The key associated with the record is used to determine the order of the hard drive data buckets. If record duplication is a concern, then prior to each insertion a search of the CD-ROM and the hard drive data buckets is necessary in order to ensure that duplicate records are not inserted into the tree. The Bloom filter associated with the hard disk drive and possibly the CD-ROM data buckets can help minimize the length of such a search since the Bloom filter is used to hash a key into a sequence of bits for determining if the key can be represented in the data bucket, and, thus the Bloom filter is able to delete duplicate entries without needing to actually read the hard disk or CD-ROM devices.

Splitting Nodes and Data Buckets

Figure 3:
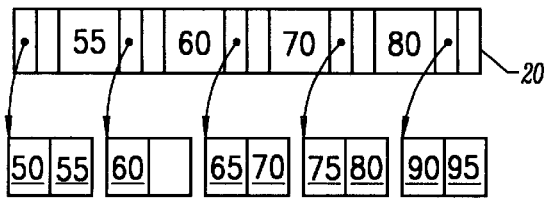
FIG. 3 is a diagram depicting the insertion of records into a B3 tree of this invention, including the splitting of the B3 tree where appropriate.
Figure 3:
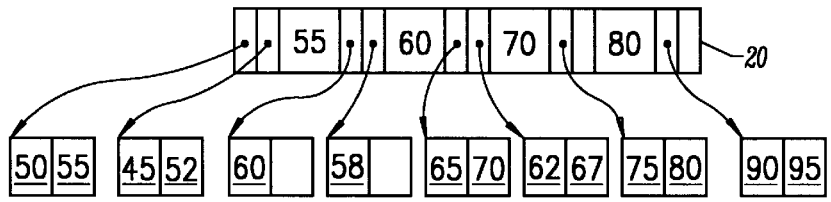
Figure 3:
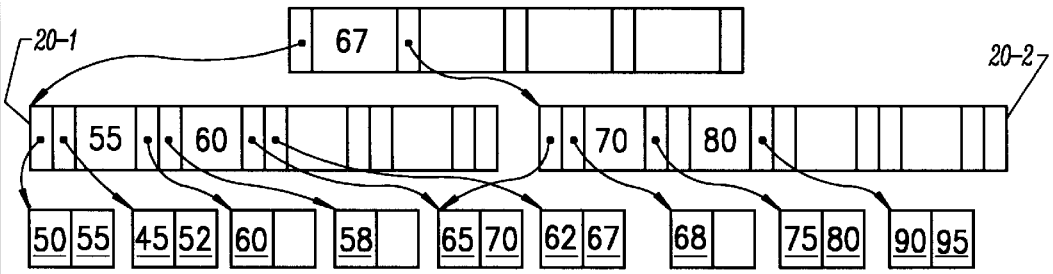
Figure 3:
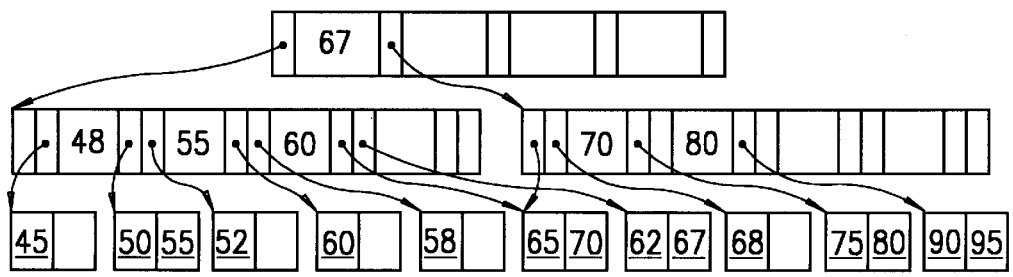
Figure 4A:
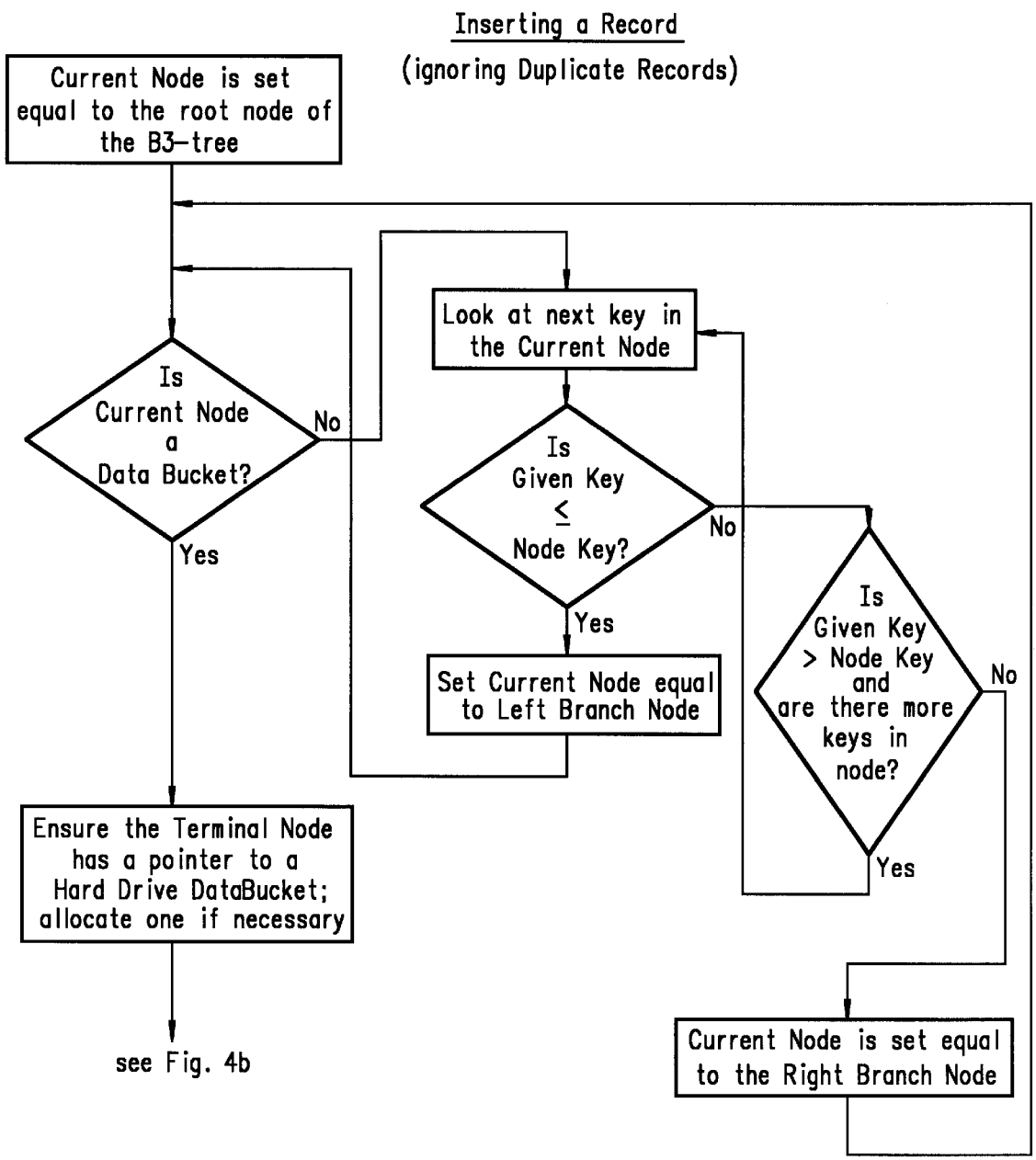
FIG. 4 is a flow chart depicting one embodiment of a method in accordance with the teachings of this invention for inserting a record and updating a B3 tree.
Figure 4B:
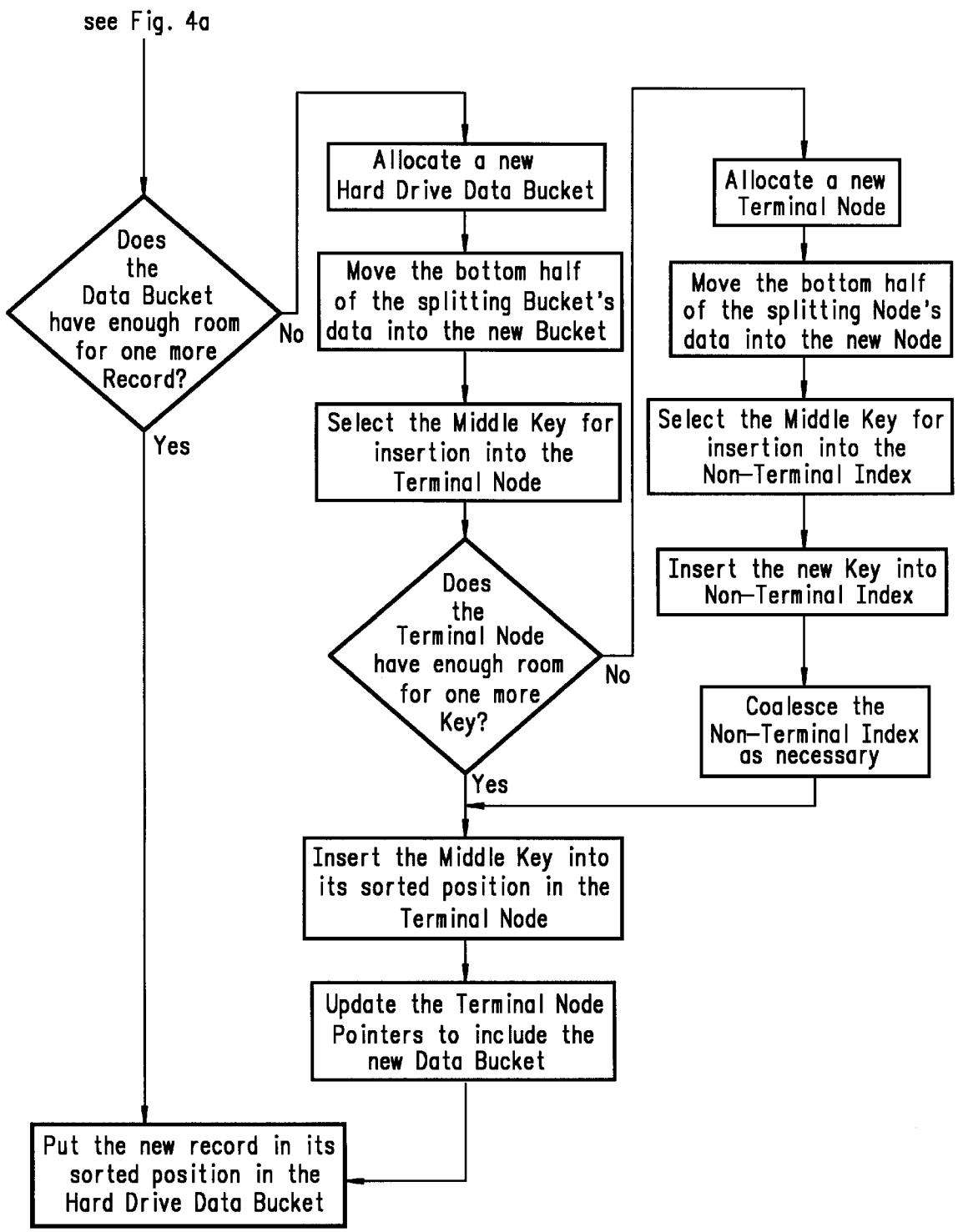

FIG. 3 is a step-by-step visual description of how the B3 tree splits in accordance with one embodiment of this invention, with FIG. 4 being a flow chart of one embodiment. As shown in step 1 of FIG. 3, the B3 tree is loaded with information pertaining to records stored on the CD-ROM.

As shown in step 2, certain records are added, by being stored on hard disk and having the B3 tree stored on hard disk being updated to reflect the addition of the new records. At step 2, the hard disk data bucket contains the records for keys 62 and 67. It's the sixth data bucket from the left in Step 2.

As shown in step 3, adding more records, in this example record 68, to the B3 tree causes the terminal nodes to split when a hard disk drive data bucket becomes full. Adding key 68, causes the addition to occur between the keys 60 and 70 since it is greater than 60 yet less than 70. New records can only be added to the hard drive data buckets so it goes into the bucket containing 62 and 67. This over flows the data bucket so it requires a split and thus the creation of a new databucket to hold the new record 68. The three keys up for consideration for propagating to the higher node are 62, 67, and 68. So, the middle one is chosen, 67, for propagation to the new created nodes. Now, all records with keys less than or equal to 67 traverse down the left branch and all keys greater than 67 are stored down the right branch. In Step 3, you can clearly see this is the case. Only the hard drive data buckets split because the CD-ROM data buckets cannot change. Just as with the prior art B+ tree, when a data bucket overflows, the bucket splits into two buckets by allocating another bucket and moving the bottom half of its data into the new bucket. The key associated with the middle record of the original data bucket and a pointer to the new data bucket are given to the terminal node for insertion.

The key received from the data bucket is inserted into its ordered position in the terminal node. The hard drive data bucket pointer to the right of the newly inserted key is updated to point at the new hard drive data bucket. The CD-ROM data bucket pointer to the right of the key is updated as well. Since the CD-ROM data bucket is static, it is impossible to insert records BETWEEN the smallest and greatest values stored on the CD-ROM data bucket. So, the CD-ROM data bucket pointer to the right of the new key is updated with the CD-ROM data bucket pointer on the left of the newly inserted key.

Step 4 shows a subsequent addition of a new key which requires a futher split in the B3 tree.

Retrieving Records

Figure 5A:
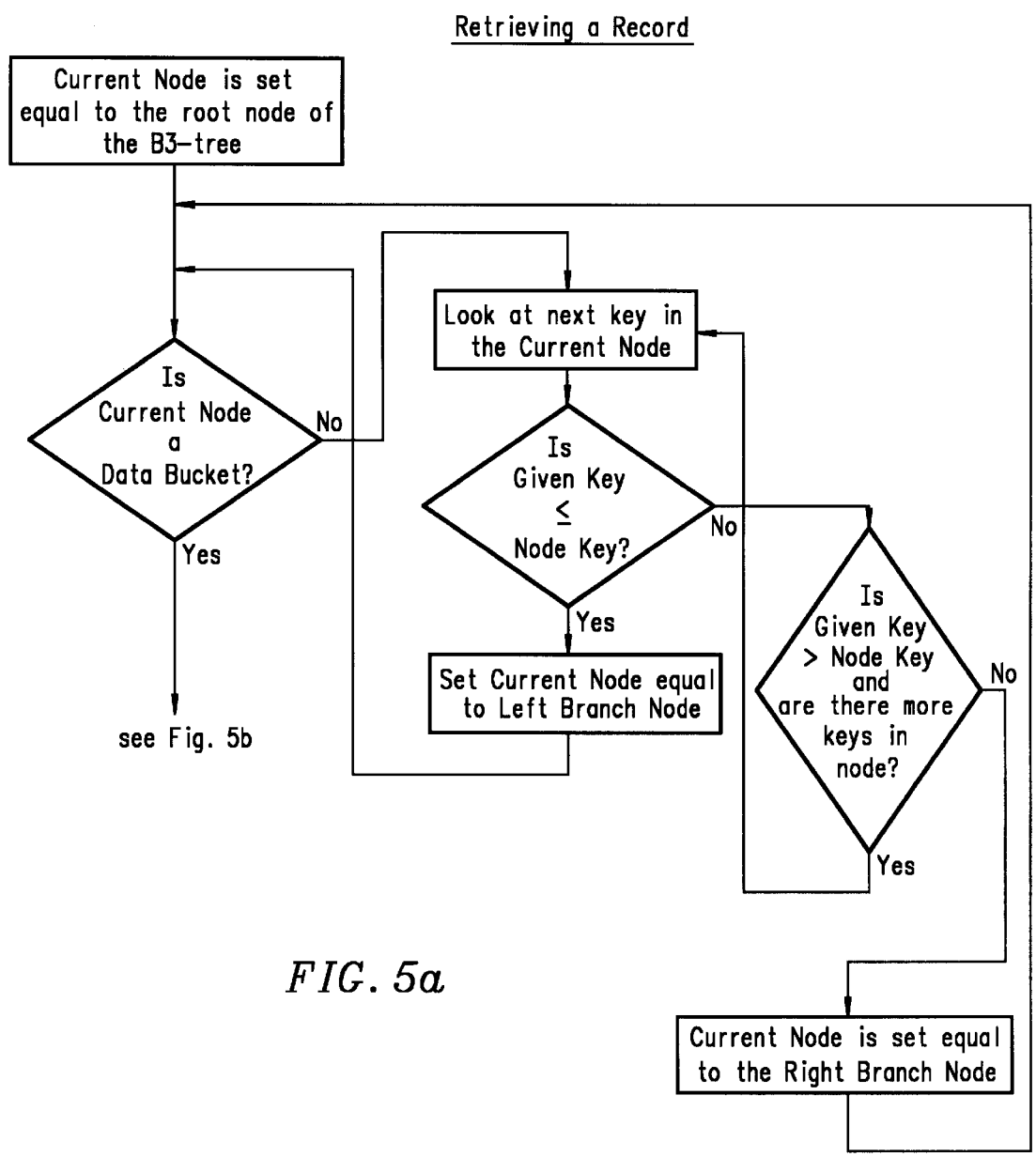
FIG. 5 is a flow chart depicting one embodiment of a method in accordance with the teachings of this invention for retreiving a record using a B3 tree.
Figure 5B:
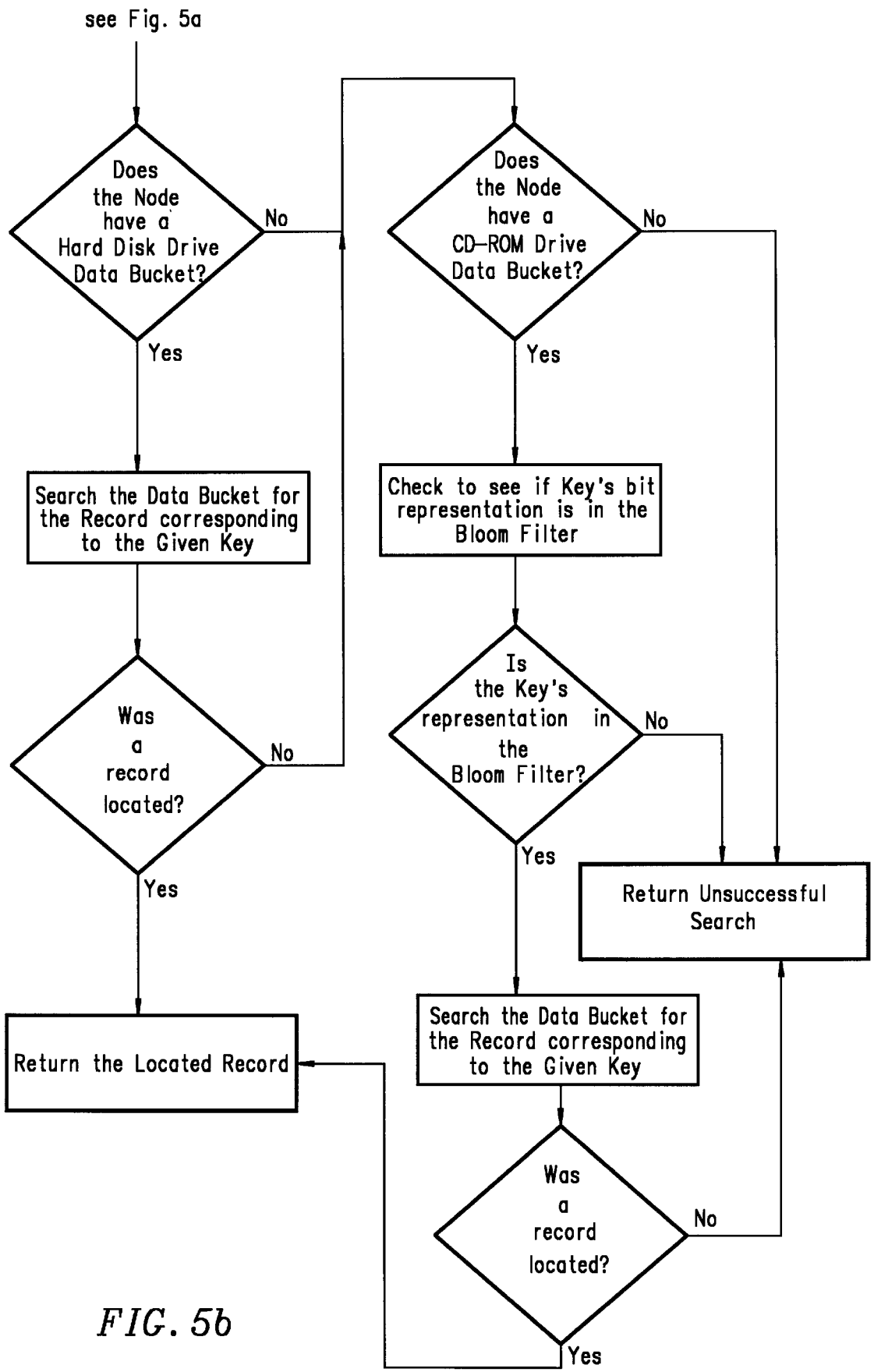

Referring to FIG. 5, retrieval begins at the root of the B3 tree index for direct access retrieval and at the leftmost terminal node for sequential access retrieval. Sequential access is fairly straightforward. Every terminal node in the tree is accessed, starting with the leftmost node and concluding with the rightmost node. When you access the contents associated with a terminal node, the CD-ROM data buckets and the hard drive data buckets are read, combined, and sorted. Mask 24 (FIG. 2) is used to omit records deleted from the CD-ROM data bucket.

In one embodiment, direct access retrievals are the same as those for a prior art B+ tree, with non-terminal nodes pointing to another node, until the terminal node is reached during the retreival process. Once in the proper terminal node, the hard disk Bloom filter 23 (FIG. 2) is checked. If the test is successful, the hard drive bucket is checked, and the record returned if it is found on the hard drive. However, it the record is not found on the hard drive, the CD-ROM data bucket is checked. If the record is found on the CD-ROM, then CD-ROM mask 24 is checked to verify that it is a valid record. If the record is valid, it is returned. Otherwise, a failed retrieval is returned.

The following is pseudo code describing one exemplary embodiment of retreival of records suing the B3 tree of this invention.

```
node = root node;
for keys in node; do
    if given key ≤ node key
        then node = node→left_branch
    if given key > node key AND node→next-key! = NULL
        then continue with next key
    node = node→right_branch:
end do.
    Now we'ere in a terminal node
    if node→hard-drive-bucket!=NULL
        then {locates record in hard drive bucket and
        returns record if found, error otherwise}
    if node→CD-ROM_bucket!=NULL
        then {
            check Bloom filter;
            if Bloom filter fails return failed retrieve
                locate record in CD-ROM data bucket
            if!found then return failed-retrieve;
            check deletion mask;
            if deleted return failed_retrieve;
            else return record;
        else return failed retrieve;
```

Deleting Records

First, the retrieval algorithm locates the record to be deleted. If the record to be deleted resides on the hard disk, it is removed from the hard disk data bucket, and any necessary coalescing is completed. When using Bloom filter 23 for the hard drive data buckets, the Bloom filter is rebuilt from the remaining valid records. In one embodiment, coalescing in the B3 tree is performed in the same manner as in a prior art B+ tree except the tree can not coalesce any smaller than its original size on the CD-ROM, since records cannot actually be removed from the CD-ROM.

If the record to be deleted resides on the CD-ROM, the bit associated with its position in the data bucket is cleared from mask 24. When a Bloom filter is used for the CD-ROM data buckets, the Bloom filter is rebuilt from the remaining valid records. The rebuilding process can consume a fair amount of time since the key for every active record (determined from valid entry mask 24) in the data bucket must be read from the compact disk. To accelerate the deletion process, in one embodiment updating the Bloom filter is deferred until a substantial number of deletions are completed from the data bucket. Since the validity of a record in the data bucket is checked using bit mask 24 on every retrieval, a deleted record will not be retrieved.

Tests

To demonstrate how well the B3 tree performs, a number of tests were conducted. The following list outlines the different tests. Results from the tests are presented in the "Results and Analysis" section.

A randomly distributed list of author names (strings) and a set of integers from a random number generator are the two types of data used for the tests. Because of the integer's smaller size, the ratio between the number in each bucket on the CD-ROM to the number in each bucket on the hard drive can be much larger than using strings.

The number of records on the compact disk versus the number of records on the hard drive is changed to demonstrate the B3 tree's attributes under various storage patterns. The ratio starts at 50/50 and is changed in steps up to 97.5/2.5.

A final test point is made with only 80% of the available records on the compact disk and 10% of the available records on the hard disk. Then, 100% of the available records are retrieved from the B3 tree. This retrieval pattern exhibits the B3 tree's characteristics when presented with empty retrievals since 10% of the available records were never stored in the B3 tree.

The bucket size is 10 for strings and 1000 for integers. The bucket size for strings is small for a real application but scales well because of the small number of strings being inserted into the test B3 tree.

The number of records used in the tests is 20,000 strings or 500,000 integers. The integers are only used for the storage utilization tests.

Two methods are used to store the B3 tree index. The first method is to keep the entire index on the hard disk; thus every nonterminal and terminal node access requires a probe of the hard disk in addition to the probe required to access a data bucket. The second storage type maintains the top two levels of the B3 tree index in primary memory.

Initially, the Bloom filters are disabled to demonstrate how the hard disk accesses can become quite excessive. The filters are turned on with 4 bits per record in each filter. So, for a bucket size of 10, a Bloom filter with 40 bits is used. There are two Bloom filters in the test B3 tree: one for the hard drive data buckets, and the other for the CD-ROM data buckets.

Counting Probes

In the tertiary storage model, probes of the CD-ROM and the hard disk are minimized with preference given to minimizing CD-ROM probes. At least twenty probes of the hard drive can be made in the amount of time it takes to complete a single probe of the CD-ROM. One of the main indicators for evaluating a data structure's performance is the average number of probes of the slowest auxiliary storage needed to retrieve a single record.

Since the CD-ROM has the slowest access time and because hard drive disk probes can't be disregarded, two values are used to approximate the average number of probes. The first value is the Average Normalized Probes (ANP). This measurement is the aggregate number of probes of the CD-ROM and is computed using equation (3).

$$\frac{(1 \times CDProbes) + (0.05 \times HDProbes) + (0 \times MemProbes)}{TotalNumberAttemptedRetrievals} \quad (3)$$

The number of hard disk probes is multiplied by 1/20 as an estimate for the number of hard disk probes that can occur for one compact disk probe. A probe into primary memory is disregarded.

The second value is the Average Total Probes. The Average Total Probes is the total number of probes of both the CD-ROM and the hard drive divided by the total number of records the test attempts to retrieve and is given by formula (4).

$$\frac{(1 \times CDProbes) + (1 \times HDProbes) + (0 \times MemProbes)}{TotalNumberAttemptedRetrievals} \quad (4)$$

It is assumed that a probe to a data bucket represents a single access to the tested storage medium, either CD-ROM or hard disk. Each probe of the nonterminal and terminal nodes in the tree is counted as an access to the hard disk unless the nodes are stored in memory. Caching recently accessed data buckets is a common optimization that is not used in the test B3 tree.

Storage Utilization

Another important measure of a data structure is its storage utilization. B trees and B+ trees are known to be inherently wasteful of space, as illustrated in Chu, Jiang-Hsing and G. D. Knott, "An Analysis of B-trees and their Variants," Information Systems, vol 14, no. 5, pp. 359–370 (1989). Some improvements have been made, as described in Baeza-Yates, Ricardo A., "A Dynamic Storage Allocation Algorithm Suitable for File Structures," Information Systems, vol. 15, no. 5, pp. 512–515 (1990), notably the B* tree (see the Chu and Knuth references cited earlier), the B# tree (Tharp), and more recently the Bit-tree, (Ferguson, Dave E., "Bit-tree: a Data Structure for Fast File Processing," Communications of the ACM, vol. 35, no. 6, pp. 114–120 (June 1992)), any of which can be used as a B3 tree index.

Two storage utilization values are important to consider in the case of a B3 tree. These are the storage utilization of data buckets on the compact disk and the storage utilization of data buckets on the hard drive. Because the CD-ROM portion of the B3 tree can be optimally packed when the CD-ROM is mastered, storage utilization on the CD-ROM can be greater than 90%.

RESULTS AND ANALYSIS

Probes and No Bloom Filters

A first example has two index levels stored in memory, a B tree order of five, and no Bloom filters. Table 1 shows that for this example if the top two levels of the B3 tree index are kept in primary memory and the rest of the index is kept on the hard drive it takes on average 0.9717 normalized probes of the compact disk to retrieve a single record when 95% of the records are stored on the compact disk.

TABLE 1

| Records On CD | Records On HD | % On HD | Total CD Probes | Total HD Probes | Normed Probes | Average Probes |
|---|---|---|---|---|---|---|
| 10000 | 10000 | 50% | 10000 | 19991 | 0.5498 | 1.4956 |
| 16000 | 4000 | 20% | 16000 | 17177 | 0.8429 | 1.6589 |
| 18000 | 2000 | 10% | 18000 | 12922 | 0.9323 | 1.5461 |
| 19000 | 1000 | 5% | 19000 | 8673 | 0.9717 | 1.3837 |
| 19500 | 500 | 2.5% | 19500 | 5219 | 0.9880 | 1.2360 |
| 16000 | 2000 | 10% | 18000 | 13335 | 1.0370 | 1.7408 |

The test results in Table 2 show that when the entire B3 tree index is kept on the hard drive, a B tree order of five, and no Bloom filters, it takes on average 1.0398 normalized probes to retrieve a single record.

TABLE 2

| Records On CD | Records On HD | % On HD | Total CD Probes | Total HD Probes | Normed Probes | Average Probes |
|---|---|---|---|---|---|---|
| 10000 | 10000 | 50% | 10000 | 79911 | 0.6998 | 4.4956 |
| 16000 | 4000 | 20% | 16000 | 77177 | 0.9929 | 4.6589 |
| 18000 | 2000 | 10% | 18000 | 72922 | 1.0823 | 4.5461 |
| 19000 | 1000 | 5% | 19000 | 68673 | 1.1217 | 4.3837 |
| 19500 | 500 | 2.5% | 19500 | 65219 | 1.1381 | 4.2360 |
| 16000 | 2000 | 10% | 18000 | 73335 | 1.2037 | 5.0742 |

Probes and Bloom Filters

The use of Bloom filters in accordance with this invention significantly reduces the number of hard drive probes when retrieving records, as shown in the example of Table 3 which has two index levels stored in memory, a B tree order of five, and 4 bit Bloom filters.

When the top two levels of the B3 tree index are stored in primary memory, 1036 hard drive probes are required with Bloom filters (Table 3) compared to 8676 hard drive proves without Bloom filters (Table 1). This corresponds to 0.9526 normalized probes on average with Bloom filters compared with 0.9717 normalized probes on average without Bloom filters.

TABLE 3

| Records On CD | Records On HD | % On HD | CD Probes | HD Probes | Normed Probes | Average Probes |
|---|---|---|---|---|---|---|
| 10000 | 10000 | 50% | 10000 | 10927 | 0.5273 | 1.0464 |
| 16000 | 4000 | 20% | 16000 | 4272 | 0.8107 | 1.0136 |
| 18000 | 2000 | 10% | 18000 | 2081 | 0.9052 | 1.0041 |
| 19000 | 1000 | 5% | 19000 | 1036 | 0.9526 | 1.0018 |
| 19500 | 500 | 2.5% | 19500 | 519 | 0.9763 | 1.0010 |
| 16000 | 2000 | 10% | 16237 | 2090 | 0.9077 | 1.0182 |

The difference in the number of hard drive probes required to retrieve the test records in Tables 3 and 4 shows that Bloom filters are not as useful when the entire index is stored on the hard drive. Table 4 is an example in which the entire index file is stored on the hard disk, a B tree order of five, and 4 bit Bloom filters are used.

TABLE 4

| Records On CD | Records On HD | % On HD | Total CD Probes | Total HD Probes | Normed Probes | Average Probes |
|---|---|---|---|---|---|---|
| 10000 | 10000 | 50% | 10000 | 70927 | 0.6773 | 4.0464 |
| 16000 | 4000 | 20% | 16000 | 64272 | 0.9607 | 4.0136 |
| 18000 | 2000 | 10% | 18000 | 62081 | 1.0552 | 4.0041 |
| 19000 | 1000 | 5% | 19000 | 61036 | 1.1026 | 4.0018 |
| 19500 | 500 | 2.5% | 19500 | 60519 | 1.1263 | 4.0010 |
| 16000 | 2000 | 10% | 16237 | 62090 | 1.0745 | 4.3515 |

Storage Utilization

Since most of the data are stored on the CD-ROM and only a small portion is stored on the hard drive, an interesting storage utilization case develops.

With random data sets, hard drive data buckets are scattered alongside the compact disk data buckets. Thus, data buckets are allocated to contain relatively few records. Table 5 shows the poor storage allocation due to the scattering of hard drive data buckets, for an example of storage utilization with a CD-ROM bucket size of 1000 and a hard drive bucket size of 1000. Varying the size of the hard drive data buckets can improve storage utilization.

TABLE 5

| Records on CD | Records on HD | Records Allocated on CD | Records Allocated on HD | % CD Storage Util. | % HD Storage Util. | % Overall Storage Util. |
|---|---|---|---|---|---|---|
| 250000 | 250000 | 350000 | 375000 | 71.4286 | 66.6664 | 69.9431 |
| 400000 | 100000 | 515000 | 514000 | 77.6697 | 19.4553 | 48.5908 |
| 450000 | 50000 | 555000 | 554000 | 81.0809 | 9.7276 | 45.0856 |
| 480000 | 20000 | 634000 | 633000 | 75.7096 | 3.1596 | 39.4632 |
| 495000 | 5000 | 688000 | 685000 | 71.9475 | 0.7299 | 36.4165 |
| 400000 | 50000 | 515000 | 514000 | 77.6697 | 9.7276 | 43.7317 |

B3 tree storage utilization is maximized when the ratio of the number of records stored on the compact disk to the number of records stored on the hard drive is set equal to the ratio of the compact disk data bucket size to the hard disk data bucket size. This approximation is given by formula (5).

$$\frac{\text{TotalNumRecordsOnCD}}{\text{TotalNumRecordsOnHD}} \approx \frac{\text{CDDataBucketSize}}{\text{HDDataBucketSize}} \quad (5)$$

If the ratio of the number of records on the CD-ROM to the number of records on the hard drive is unknown, it is better to choose a hard drive data bucket size that is too small versus one that is too large.

When the hard drive data bucket size is adjusted, the B3 tree achieves data storage utilization levels expected for variants of the B tree on both the compact disk and the hard drive, as per the Chu reference article. Table 6 depicts storage utilization with ratio of CD-ROM bucket size to hard drive bucket size equal to ratio of records on the CD-ROM to records on the hard drive.

TABLE 6

| CD to HD Storage Ratio | HD Data Bucket Size | Records Allocated on CD | Records Allocated on HD | % CD Storage Util. | % HD Storage Util. | % Overall Storage Util. |
|---|---|---|---|---|---|---|
| 1:1 | 1000 | 350000 | 345000 | 71.4286 | 72.4638 | 71.9425 |
| 4:1 | 250 | 513000 | 157500 | 73.0994 | 79.3651 | 74.5712 |
| 8:1 | 125 | 540000 | 85750 | 81.0185 | 72.8863 | 79.9041 |
| 9.5:1 | 105 | 552000 | 70560 | 81.0449 | 74.5918 | 80.3135 |
| 9.9:1 | 10 | 553000 | 69540 | 81.2828 | 72.6273 | 80.3161 |

Conclusions

The algorithms and design decisions made for the B3 tree can easily be applied to other data structures similar to the B tree. Hsiao and Tharp's adaptive hashing provides many benefits of both linear hashing and B+ trees including some unique features, as described in Hsiao, Y. and Tharp, A. L., "Adaptive Hashing," Information Systems, vol. 13, no. 1, pp. 111–127 (1988). In the case of adaptive hashing, the data page pointer is modified to accommodate the B3 tree's data allocation scheme.

Bounded disorder file structures are also candidates for this CD-ROM based file structure (Tharp, A. L. and Boswell, W., "B+-trees, Bounded Disorder and Adaptive Hashing," Information Systems. vol. 16, no. 1, pp. 65–7.1 (1991); Litwin, W. and Lomet, D. B., "A New Method for Fast Data Searches with Keys," IEEE Software, Mar., pp. 16–2. (1987)). In fact, the index files might make it more suitable by taking the extra information out of the terminal nodes and putting it into the index files. Storing the information in this manner might permit a greater portion of the B+ tree to be maintained in primary memory.

Christodoulakis, Stavros and Ford, Daniel Alexander, "File Organizations and Access Methods for CLV Optical Disks," Sigir Forum, vol. 23, no. 192, pp. 152–159 (1989) shows that the traditional B tree does not work well with the CD-ROM. Thus, data structures specifically designed for the CD-ROM are necessary to use the new optical storage medium efficiently.

The B3 tree is an example of what can develop when a data structure and its algorithms are redesigned for a the tertiary storage model. The B3 tree not only makes a read-only medium appear readable and writable, but exemplifies how hard disk caching can improve read-only compact disk performance.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

What is claimed is:

1. A data processing system for use with a computer having central processing unit and a memory system, said memory system having a first memory type and a second memory type where one of said memory types is a prerecorded read only memory, said data processing system comprising:
   (A) a B tree structure for accessing data stored in said memory system, said B tree structure having non-terminal nodes and terminal nodes each of said terminal nodes including:
   a plurality of keys each associated with corresponding data buckets stored within said memory system;
   a plurality of first pointers, each said first pointer being associated with one of said keys of said B tree and corresponding to data stored in said first memory type; and
   a plurality of second pointers, each second pointer being associated with one of said keys of said B tree and corresponding to data stored in said second memory type; and
   (B) wherein said processor is configured to:
   update said keys to associate each key with most recent data, wherein said update may associate a pointer with a different memory type;
   locate within said B tree a key associated with a desired data bucket corresponding to desired data to be accessed;
   determine if a first desired pointer exists indicating that said desired data bucket is stored in said first memory type and, if affirmative, to access said desired data from said desired data bucket within said first memory type; and
   when said processor determines that said first desired pointer exists is negative, to determine if a second desired pointer exists indicating that said desired data bucket is stored in said second memory type and, if affirmative, to access said desired data from said desired data bucket within said second memory type.

2. A computer system as in claim 1 wherein each of said terminal nodes further includes a Bloom filter configured to store data representing whether a specific record is stored in said first memory type or in said second memory type.

3. A computer system as in claim 1 wherein each of said terminal nodes further includes a bit mask having a plurality of bits, each bit associated with a record in one of said data buckets and indicating at least one of the presence and validity of data stored in said first memory type.

4. A computer system as in claim 1 wherein each of said terminal nodes further includes a third pointer configured to point to a sequential terminal node.

5. A method for accessing data from a memory system having a first memory type and a second memory type where one of said memory types is a prerecorded read only memory, said memory system employing a B tree having non-terminal nodes and terminal nodes, each of said terminal nodes including
   a plurality of keys each associated with corresponding data buckets stored within said memory system;
   a plurality of first pointers, each said first pointer being associated with one of said keys of said B tree and corresponding to data stored in said first memory type; and a plurality of second pointers, each second pointer being associated with one of said keys of said B tree and corresponding to data stored in said second memory type;

said method comprising the steps of:

updating said keys to associate each key with most recent data, wherein said updating step may associate a pointer with a different memory type;

locating within said B tree a key associated with a desired data bucket corresponding to desired data to be accessed;

determining if a first desired pointer exists indicating that said desired data bucket is stored in said first memory type and, if affirmative, accessing said desired data from said desired data bucket within said first memory type;

when said step of determining if said first desired pointer exists is negative, determining if a second desired pointer exists indicating that said desired data bucket is stored in said second memory type and, if affirmative, accessing said desired data from said desired data bucket within said second memory type.

6. A method as in claim 5 wherein each of said terminal nodes further includes a Bloom filter configured to store data representing whether a specific record is stored in said first memory type or in said second memory type, said method further comprises the step of determining whether said desired data is in said first or said second memory type by utilizing said Bloom filter.

7. A method as in claim 5 wherein each of said terminal nodes further includes a bit mask having a plurality of bits, each bit associated with a record in one of said data buckets and indicating at least one of the presence and validity of data stored in said first memory type, said method further comprising the step of:

prior to said step of accessing said second memory type, determining if said bit mask indicates that said first memory type does not include valid data being accessed.

8. A method as in claim 5 wherein each of said terminal nodes further includes a third pointer configured to point to a sequential terminal node said method further comprising the step of:

accessing said third pointer when a desired pointer exist in a sequential terminal node.

9. A method of inserting a new record into a B tree using a memory system having a first read/write memory type and a second read-only memory type the B tree having non-terminal nodes and terminal nodes, each of the terminal nodes including; a plurality of keys each associated with corresponding data buckets stored within the memory system; a plurality of first pointers each the first pointer being associated with one of the keys of the B tree and corresponding to data stored in the first memory type and a plurality of second pointers each second pointer being associated with one of the keys of the B tree and corresponding to data stored in the second memory type the method comprising the steps of:

(a) setting a current node equal to a root node of the B tree;

(b) determining whether the current node is a data bucket;

(c1) if the current node is not a data bucket then retrieving a next given key in the current node and determining whether the given key is less than or equal to a node key (c2) if the given key is less than or equal to the node key setting the current node equal to a left branch node and returning to step (b);

(c3) if the given key is not less than or equal to the node key determining whether there are any more keys in the node and if so returning to step (c1);

(c4) if there no more keys in the node, setting the current node equal to a right branch node and returning to step (b);

(d1) if the current node is a data bucket then ensuring that the terminal node has a pointer to a data bucket in said first memory and if not, allocating one;

(d2) determining if the data bucket has enough room for the new record and if so storing the new record in the data bucket;

(d3) if the data bucket does not have enough room for the new record allocating a new data bucket in said first memory type splitting an old data bucket moving a bottom half of data in the old data bucket into the new data bucket and selecting a middle key for insertion into a terminal node:

(d4) determining if the terminal node has enough room for one more key and if so, inserting the middle key into a sorted position in the terminal node updating the terminal node pointers to include the new data bucket and storing the new record in the new data bucket; and (d5) if the terminal node does not have enough room for one more key, allocating a new terminal node splitting on old terminal node, moving a bottom half of data in the old terminal node into the new terminal node, inserting the middle key into a non-terminal index, inserting the new key into the non-terminal index, inserting the middle key into its sorted position in the new terminal node, updating the new terminal node pointers to include the new data bucket and storing the new record in the new data bucket.

10. A method of retrieving a record from a B tree using a memory system having a first read/write memory type and a second read-only memory type, the B tree having non-terminal nodes and terminal nodes each of the terminal nodes including: a plurality of keys each associated with corresponding data buckets stored within the memory system a plurality of first pointers each the first pointer being associated with one of the keys of the B tree and corresponding to data stored in the first memory type; and a plurality of second pointers, each second pointer being associated with one of the keys of the B tree and corresponding to data stored in the second memory type the method comprising the steps of:

(a) setting a current node equal to a root node of the B tree;

(b) determining whether the current node is a data bucket;

(c1) if the current node is not a data bucket then retrieving a next given key in the current node and determining whether the given key is less than or equal to a node key;

(c2) if the given key is less than or equal to the node key setting the current node equal to a left branch node and returning to step (b);

(c3) if the given key is not less than or equal to the node key determining whether there are any more keys in the node, and if so returning to step (c1);

(c4) if there are no more keys in the node, setting the current node equal to a right branch node and returning to step (b);

(d1) if the current node is a data bucket determining whether the node has a corresponding first memory type data bucket;

(d2) if the current node does have a corresponding first memory type data bucket searching the data bucket for a record corresponding to the given key and if the record is located returning the located record, and if not moving to step (d3);

(d3) determining whether the node has a corresponding second memory type data bucket and if not, returning an unsuccessful search result;

(d4) if the node dots have a corresponding second memory type data bucket, determining whether the key has a corresponding bit representation in the Bloom filter and if not returning an unsuccessful search result; and (d5) if the node does have a corresponding bit representation in the Bloom filter searching the data bucket for the record corresponding to the given key and if found returning the located record and if not found returning an unsuccessful search result.

11. A B tree structure for use with a computer having a processor, a read-only memory and a read/write memory, said data processing system comprising:

a plurality of nodes interconnected having non-terminal nodes and terminal nodes;

wherein each of said terminal nodes include:

a first pointer configured to store keys corresponding to data buckets stored in said read-only memory;

a second pointer configured to store keys corresponding to data buckets stored in said read/write memory;

a third pointer configured to point to a sequential terminal node;

a bit mask for each of said data buckets having a size corresponding to a number of records stored in a data bucket in said read-only memory and providing data regarding at least one of the presence and validity of records in said date buckets in said read-only memory; and a Bloom filter configured to store data representing whether a specific record is stored in said read-only memory or in said read/write memory.

12. The B tree structure of claim 11, wherein:

said processor is configured to receive additional data to be stored in said B tree and to split said B tree to organize said additional data in said B tree.

13. The B tree structure of claim 12, wherein:

said processor is configured to associate keys in said second pointer with said additional data, and when said additional data replaces old data stored in said read-only memory, to set said bit mask to identify said old data is invalid.

14. The B tree structure of claim 11, wherein:

said processor is configured to retrieve desired data and configured to locate a key associated with a desired data bucket corresponding to desired data to be retrieved.

15. A method of storing and retrieving data using a computer having a processor, a read-only memory and a read/write memory, comprising the steps of:

(A) creating a B tree of nodes interconnected having non-terminal nodes and terminal nodes;

(B) in each terminal node:

storing in a first pointer keys corresponding to data buckets stored in said read-only memory;

storing in a second pointer keys corresponding to data buckets stored in said read/write memory;

storing a third pointer to point to a sequential terminal node;

setting a bit mask for each of said data buckets having a size corresponding to a number of records stored in a data bucket in said read-only memory and providing data regarding at least one of the presence and validity of records in said data buckets in said read-only memory; and storing data in a Bloom filter representing whether a specific record is stored in said read-only memory or in said read/write memory.

16. The method of claim 15, further comprising the step of:

receiving additional data to be stored in said B tree and splitting said B tree to organize said additional data in said B tree.

17. The method of claim 16, further comprising the steps of:

associating keys in said second pointer with said additional data, and when said additional data replaces old data stored in said read-only memory, setting said bit mask to identify said old data is invalid.

18. The method of claim 15, further comprising the step of:

retrieving desired data by locating a key associated with a desired data bucket corresponding to desired data to be retrieved.

* * * * *